US006957048B2

(12) United States Patent
Formenti

(10) Patent No.: US 6,957,048 B2
(45) Date of Patent: Oct. 18, 2005

(54) SWITCHING CIRCUIT FOR CHARGE AND DISCHARGE OF MULTIPLE BATTERY SYSTEMS

(75) Inventor: Jose Antonio Vieira Formenti, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 526 days.

(21) Appl. No.: 10/123,776

(22) Filed: Apr. 16, 2002

(65) Prior Publication Data

US 2004/0192407 A1 Sep. 30, 2004

(51) Int. Cl.[7] .................................................. H04Q 7/20
(52) U.S. Cl. ..................................... 455/90.1; 455/572
(58) Field of Search .............................. 455/572, 573, 455/574, 90.1, 334, 337, 127.1, 537, 534; 320/127, 128, 134, 136, 120, 121, 163, 116, 126; 307/66

(56) References Cited

U.S. PATENT DOCUMENTS

| | | |
|---|---|---|
| 4,754,160 A | 6/1988 | Ely |
| 5,598,041 A | 1/1997 | Willis |
| 5,764,032 A | 6/1998 | Moore |
| 5,818,200 A | 10/1998 | Cummings et al. |
| 5,955,867 A | 9/1999 | Cummings et al. |

| | | | |
|---|---|---|---|
| 6,583,603 B1 | * | 6/2003 | Baldwin ..................... 320/121 |

FOREIGN PATENT DOCUMENTS

| | | |
|---|---|---|
| EP | 0660520 A2 | 6/1995 |
| EP | 0871275 A2 | 10/1998 |

OTHER PUBLICATIONS

Williams et al. "Single package 30–V Battery Disconnect Switch Facilitates Battery Multiplexing in Notebook Computers" Applied Power Electronics Conference and Exposition, 1998. Apec '98. Conference Proceedings 1998., Thirteenth Annual Anaheim, CA,. USA Feb. 15–19, 1998, New York, NY, USA, IEEE, US, Feb. 15, 1998, pp. 691–699, XP010263668 ISBN: 0–7803–4340–9 "figures 11, 17".

* cited by examiner

Primary Examiner—Jean Gelin
(74) Attorney, Agent, or Firm—W. Daniel Swayze, Jr.; W. James Brady; Frederick J. Telecky, Jr.

(57) ABSTRACT

Multiple battery systems and switching networks are provided for portable electronic devices. A single switching cell is provided per battery and a load switch coupled to a battery power bus to achieve proper connectivity and isolation between batteries, a load and a charger. The single switching cells are configured as a back-to-back MOSFET switch devices. The charger is also coupled to the battery power bus and can be enabled when AC power to the portable electronic device is not available. The present invention facilitates selective connection of battery packs in a multiple battery system to a load or a charger, while still maintaining isolation between battery packs, the load and the charger.

23 Claims, 8 Drawing Sheets

US 6,957,048 B2

SWITCHING CIRCUIT FOR CHARGE AND DISCHARGE OF MULTIPLE BATTERY SYSTEMS

TECHNICAL FIELD

The present invention relates to electrical circuits and more particularly to switching networks for multiple battery systems.

BACKGROUND OF INVENTION

Portable electronic devices (e.g., notebook computers, cellular telephone, cordless telephones mobile data terminals, radio frequency portable communication devices, etc.) typically include a rechargeable battery that is charged by a recharging unit plugged into an AC power source, such as that found in conventional 115 VAC lines. Certain rechargeable batteries can be recharged by coupling the rechargeable battery to a DC voltage source (e.g., car adapter, plane adapter, airplane adapter, USB power bus) The recharging unit powers the portable device, while simultaneously charging the rechargeable battery. The portable device switches over to battery power upon removal of the portable device from the charging unit or the power source. Some portable electronic devices are provided with two or more batteries, so that the portable electronic device can be used for longer periods of time than is possible with a single battery.

In systems with multiple batteries, a switching network is required to allow selective charging and discharging of each battery pack, while maintaining isolation between battery packs, a battery charger and a load. In normal operation, each battery can be in a different state of charge and, as a result, have different output voltages. This characteristic makes the use of single switches not practical, as the parasitic back-gate diode, associated with discrete power Metal-Oxide-Semiconductor Field-Effect Transistors (MOSFETs) when in an off mode, will cause the system to go in a diode-OR configuration. In general this is unacceptable, as most systems require each battery to be isolated from the others during charging and discharging.

Conventional solutions utilize two MOSFETs in a back-to-back configuration to isolate the batteries, the charger and the load. The back-to-back configuration provides isolation by assuring that one or the other of the body diodes is reverse-biased at all times. The switching of the MOSFETs can be controlled by logic signals from a control system. Conventional two battery systems have existing switching network configurations that use a maximum of eight back-to-back MOSFETS and four control signals or six back-to-back MOSFETS and six control signals. FIG. 1 illustrates an example of a switching network having an eight MOSFET configuration, while FIG. 2 illustrates a switching network having a six MOSFET configuration.

FIG. 1 illustrates a multiple battery system 10 with a switching network having an eight MOSFET configuration in accordance with a conventional system. The multiple battery system 10 includes a first switching cell 20 having a first p-type MOSFET Q1 coupled to a second p-type MOSFET Q2 in a back-to-back configuration to isolate a first battery 28 from a load 18. The drains of the first p-type MOSFET Q1 and the second p-type MOSFET Q2 are coupled to one another, such that the back-gate diodes or parasitic diodes of the first p-type MOSFET Q1 and the second p-type MOSFET Q2 have conduction paths in opposite directions. The body diodes formed between the substrate and source (not shown) have opposite conduction paths of the first p-type MOSFET Q1 and the second p-type MOSFET Q2 since the body diodes are in series with the back gate diode and have a conduction direction opposite to the back gate diode. The first switching cell 20 is turned on and off by a single control line /BL1. A second switching cell 22 includes a third p-type MOSFET Q3 coupled to a fourth p-type MOSFET Q4 to isolate the first battery 28 from a charger 16. The second switching cell 22 is configured the same as the first switching cell 20 in a back-to back configuration. The second switching cell 22 is turned on and off by a single control line /B1C.

A third switching cell 24 includes a fifth p-type MOSFET Q5 coupled to a sixth p-type MOSFET Q6 to isolate a second battery 30 from the charger 16. The third switching cell 24 is configured the same as the first and second switching cells 20 and 22, respectively, in a back-to back configuration. The third switching cell 24 is turned on and off by a single control line /B2C. A fourth switching cell 26 includes a seventh p-type MOSFET Q7 coupled to an eighth p-type MOSFET Q8 to isolate the second battery 30 from the load 18. The fourth switching cell 26 is configured the same as the first, the second and the third switching cells 20, 22 and 24, respectively, in a back-to back configuration. The fourth switching cell 26 is turned on and off by a single control line /B2L. A DC supply 12 is coupled to the load 18 through a diode D1. The DC supply 12 is also coupled to the charger 16. When power from the DC supply 12 is available, the DC supply 12 powers the load 18 and the charger 16. The charger 16 can provide charge to either the first battery 28 or the second battery 30 by selecting the second or third switching cells 22 and 24, respectively. When power from the DC supply 12 is not available, the first battery 28 or the second battery 30 can provide power to the load 18 by selecting the first or the fourth switching cells 20 and 26, respectively.

FIG. 2 illustrates a multiple battery system 40 and switching network having a six MOSFET configuration in accordance with a conventional system. The multiple battery system 40 includes a first switching cell 44 having a first p-type MOSFET Q9 coupled to a second p-type MOSFET Q10, a second switching cell 46 having a third p-type MOSFET Q11 coupled to a fourth p-type MOSFET Q12, and a third switching cell 48 having a fifth MOSFET Q13 coupled to a sixth p-type MOSFET Q14. A load 56 is coupled to a node 58 connecting the sources of the third and fourth p-type MOSFETS Q11 and Q12, respectively. A DC supply 54 is also coupled to the node 58 through a diode D2. A first battery 50 is coupled to the drain of the second p-type MOSFET Q12, and a second battery 52 is connected to the drain of the sixth p-type MOSFET Q14. Each MOSFET is controlled by a single control line (Q9-/B1C, Q10-/B1S, Q11-/B1L, Q12-/B2L, Q13-/B2C, Q14-/B2S).

When power from the DC supply 54 is available, the DC supply 54 powers the load 56 and the charger 42. The charger 42 can provide charge to either the first battery 50 or the second battery 52 by selecting the first switching cell 44 or the third switching cell 48. Charging of the first battery 50 is accomplished by selecting the first MOSFET Q9 and the second MOSFET Q10 via the control lines /B1C and /B1S, while charging of the second battery 52 is accomplished by selecting the fifth MOSFET Q13 and the sixth MOSFET Q14 via the control lines /B2C and /B2S. When power from the DC supply 54 is not available, the first battery 50 can provide power to the load 56 by selecting the second p-type MOSFET Q10 of the first switching cell 44 via control line /B1S and the third p-type MOSFET Q11 of the second switching cell 46 via control line /B1L. Alternatively, the second battery 52 can provide power to the load 56 by selecting the sixth p-type MOSFET Q14 of the third switching cell 48 via control line /B2S and the fourth p-type MOSFET Q12 of the second switching cell 46 via control line /B2L.

In some applications it is desirable to add additional batteries to the multiple battery systems. Four additional switches and two control lines are required for each additional battery added to the configuration of FIG. 1, while three switches and three control lines are required for each additional battery added to the configuration of FIG. 2. It is desirable to provide a configuration that reduces the number of parts in a multiple battery system to reduce costs and complexity, in addition to providing a configuration that facilitates the expansion of additional batteries in a multiple battery system with reduced parts.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to multiple battery systems and switching networks for portable electronic devices. The system and methods utilize a single switching cell per battery and a load switch coupled to a battery power bus to achieve proper connectivity and isolation between batteries, a load and a charger. The single switching cells are configured as a back-to-back MOSFET switch devices. The charger is also coupled to the battery power bus and can be enabled when AC power to the portable electronic device is available. The present invention facilitates selective connection of battery packs in a multiple battery system to a load or a charger, while still maintaining isolation between battery packs, the load and the charger. The back-to-back MOSFET switch device are connected together at one end to create a battery power bus that is connected to the charger output, and that can be connected to the load by a load switch when the charger is disabled. The back-to-back MOSFET switch devices can be used to select between charging of batteries and employment of batteries in powering the load.

In charge mode, the charger is enabled and the DC switch is turned on, connecting the DC supply to the load, with the load switch turned off, effectively isolating the battery power bus from the load. The selected battery is connected to the battery power bus and the charger output by turning on one of the battery switches. In discharge mode, the charger is disabled, the battery power bus is connected to the load by turning on the load switch, and the selected battery is connected to the battery power bus by turning on one of the battery switches.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention facilitates selective connection of battery packs in a multiple battery system to a load or a charger, while still maintaining isolation between battery packs, the load and the charger. The present invention utilizes a single cell or back-to-back battery switch configuration for each battery pack in the multiple battery system. The battery switch outputs are connected together, creating a "battery power bus" that is connected to the charger output and that can be connected to the load by a load switch when the charger is disabled. The charger is enabled by a control signal and has a high impedance path between a DC supply and the battery power bus in off mode. Logic control signals select which battery is connected to the battery power bus.

The proposed topology utilizes two MOSFETs in a back-to-back configuration to control connection of each battery to the battery power bus. The charger output is connected to the power bus and enabled only when a battery is being charged. The power bus connection to the load is implemented by a single MOSFET switch (load switch) and the DC supply connection to the load is implemented by a single MOSFET switch (DC switch) or diode. The present invention is illustrated with respect to multiple battery systems. However, the present invention is applicable to a variety of other rechargeable power sources that employ switching networks to isolate the power sources from one another, a load and a charger.

Figure 1:
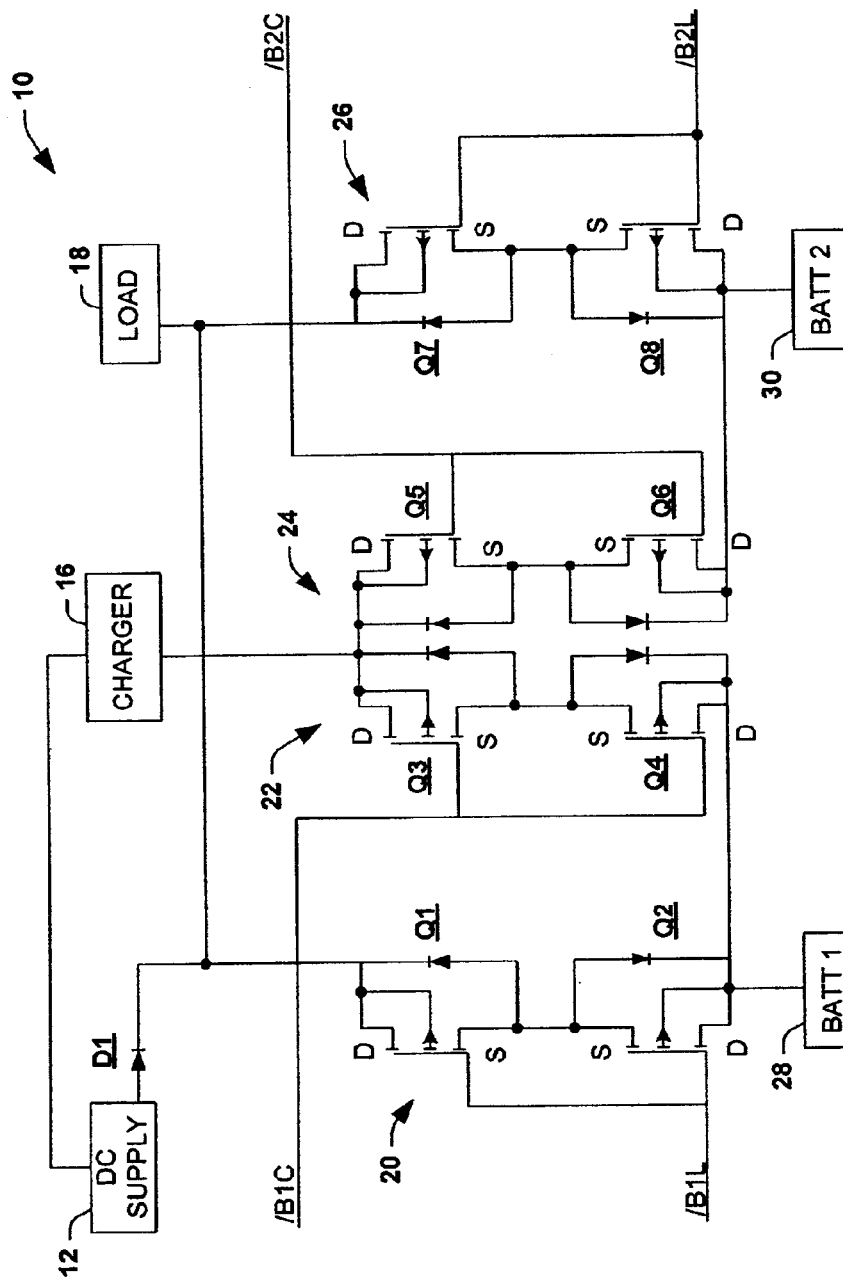
FIG. 1 illustrates a multiple battery system switching network with eight back-to-back MOSFETS in accordance with the prior art.
Figure 2:
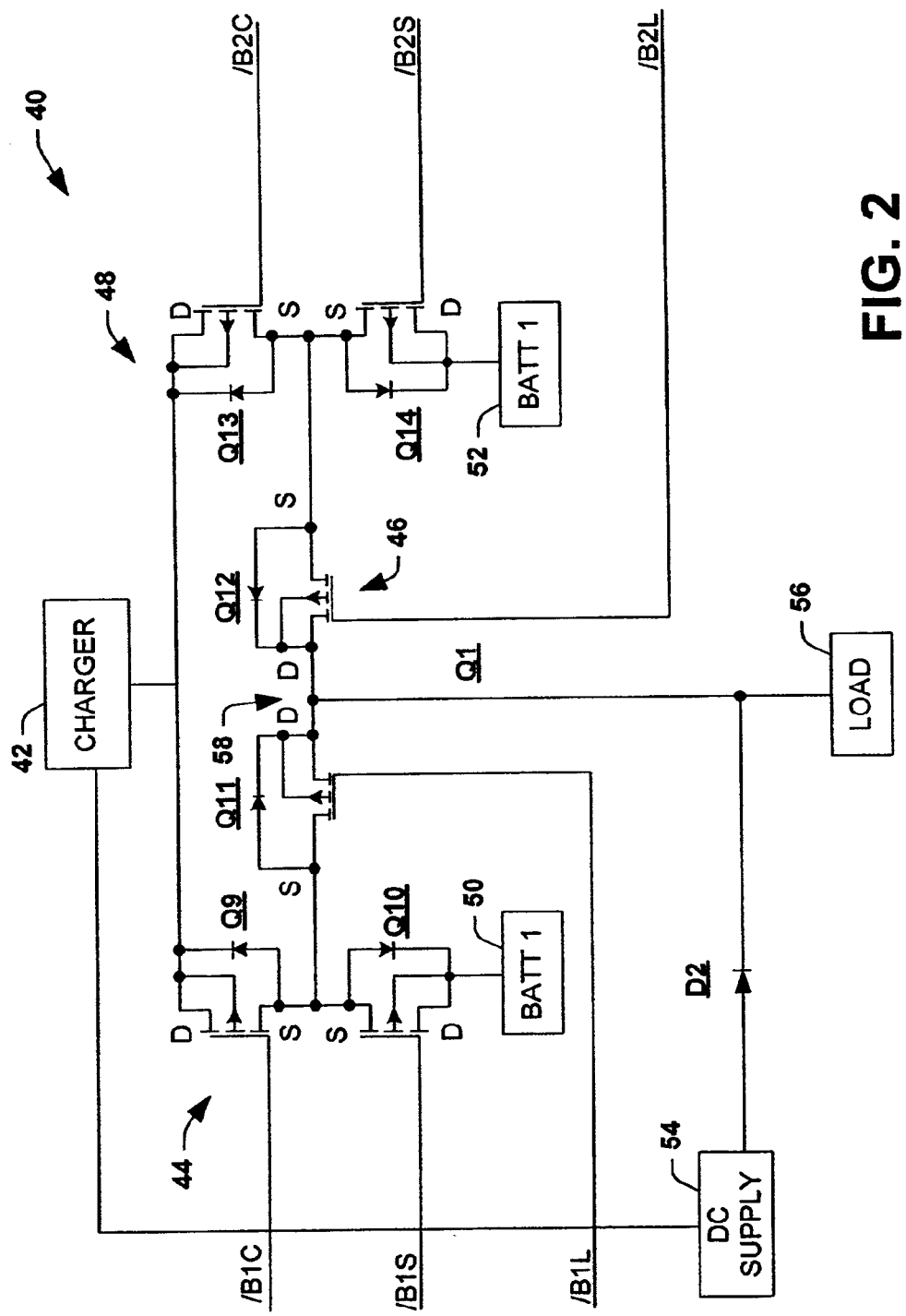
FIG. 2 illustrates a multiple battery system switching network with six back-to-back MOSFETS in accordance with the prior art.
Figure 3:
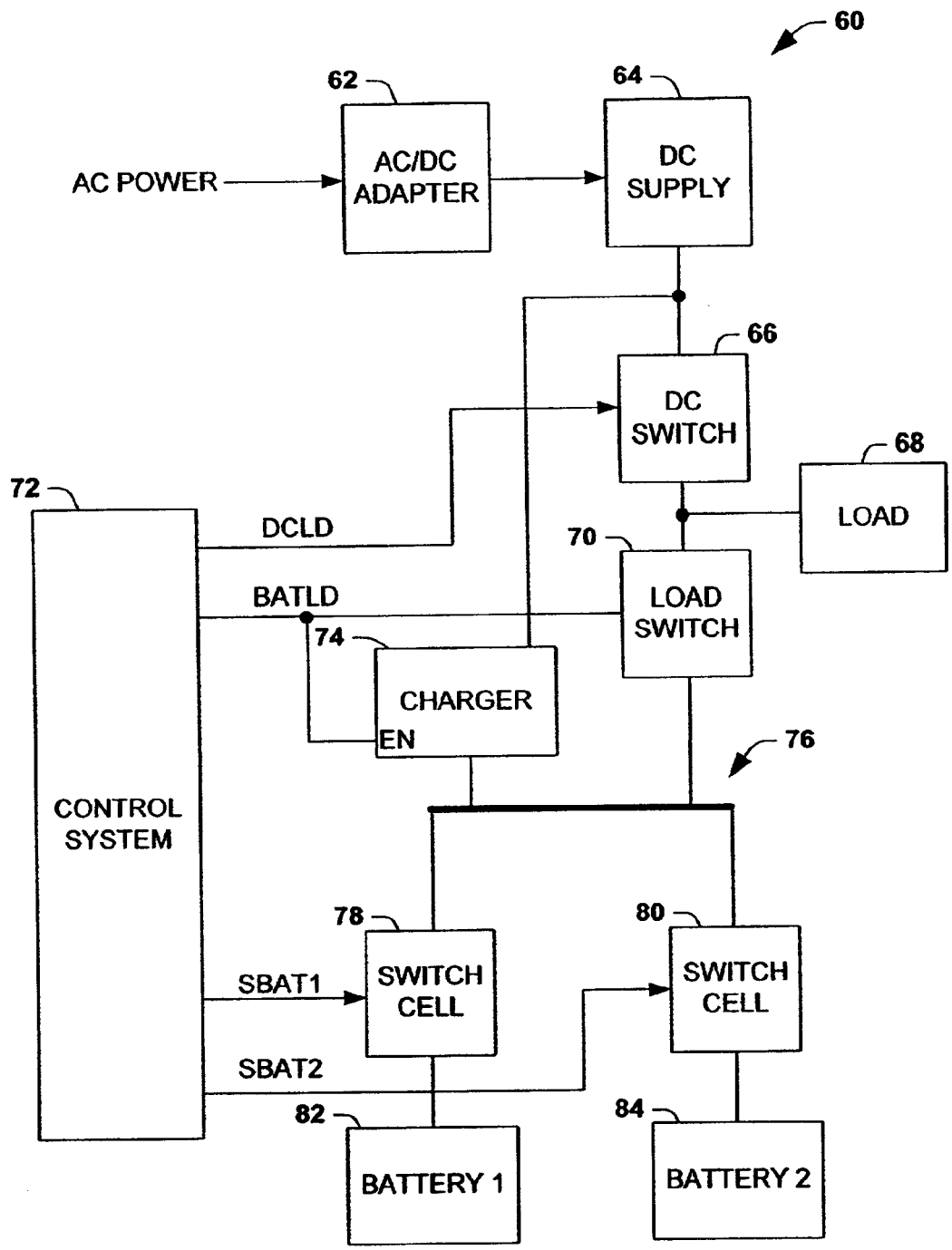
FIG. 3 illustrates a portable electronic device with a multiple battery system switching network in accordance with an aspect of the present invention.

FIG. 3 illustrates a portable electronic device 60 having a multiple battery system using a switching network configuration in accordance with an aspect of the present invention. The portable electronic device 60 includes a first switching cell 78 having a back-to-back MOSFET configuration. The first switching cell 78 couples and isolates a first battery 82 from a battery power bus 76. The first switching cell 78 is turned on and off by a single control line SBAT1. A second switching cell 80 includes a back-to-back MOSFET configuration to isolate a second battery from the power bus 76. The second switching cell 80 is turned on and off by a single control line SBAT2. The back-to-back MOSFET configuration of the first switching cell 78 and the second switching cell 80 can be two n-type MOSFET devices coupled in a back-to-back configuration, two p-type MOSFET devices coupled in a back-to-back configuration or a combination of n-type and p-type MOSFET devices as long as the back-gate diodes of each device have opposite conduction directions.

A load switch 70 isolates the battery bus 76 from a load 68. A charger 74 is also coupled to the battery bus 76. The charger 74 includes an enable control that disables and enables the charger 74. A single control line (BATLD) has a first state that enables the charger 74 and opens the load switch 70, and a second state that disables the charger 74 and closes the load switch 70. A DC supply 64 is coupled to the load 68 through a DC switch 66 (e.g., diode, MOSFET). The DC supply 64 is also coupled to the charger 74 to provide power to the charger 74. An AC/DC adapter 62 receives AC power from an AC power source, such as that found in conventional 115 VAC lines and provides unregulated DC power to the DC supply 64. The DC supply 64 converts the unregulated DC power to regulated DC power. The DC supply 64 can be a synchronous buck converter or some other switching power supply.

A control system 72 controls the switching of the power sources (e.g., DC Supply, battery 1, battery 2) to the load 68, the charging of the batteries 82 and 84 and the isolation of the devices from one another. If AC power is available, the control system 72 closes the DC switch 66 and opens the load switch 70, so that power from the DC supply 64 is provided to the load 68 and the charger 74, and the battery bus 76 is isolated from the load 68. The opening of the load switch 70 also enables the charger 74 since the control line BATLD is connected to both devices. The charge from the charger 74 is then available at the battery power bus 76. The control system 72 provides charge from the charger 74 to the first battery 82 by selecting the first switching cell 78 using control line SBAT1, or the second battery 84 by selecting the second switching cell 80 using the control line SBAT2.

If AC power is not available, the control system 72 opens the DC switch 66 and closes the load switch 70, so that power from the battery bus 76 is provided to the load 68, and the DC supply 64 is isolated from the load 68. The closing of the load switch 70 also disables the charger 74 since the control line BATLD is connected to both devices. The control system 72 can provide power to the power bus 76 and the load 68 from the first battery 82 by selecting the first switching cell 78 using control line SBAT1, or provide power from the second battery 84 by selecting the second switching cell 80 using the control line SBAT2.

Figure 4:
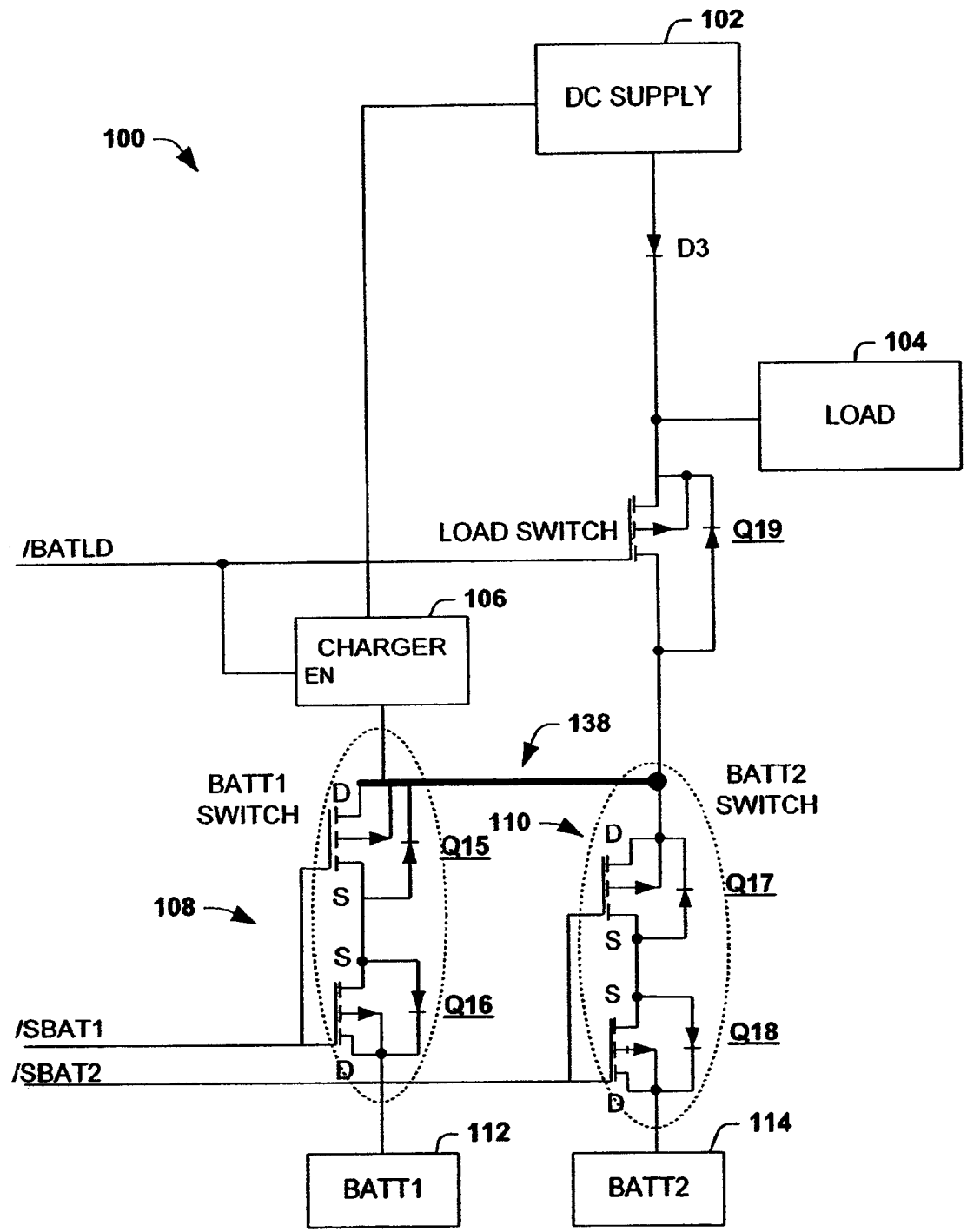
FIG. 4 illustrates a multiple battery system having a five MOSFET switching configuration in accordance with an aspect of the present invention.

FIG. 4 illustrates a multiple battery system 100 having a five MOSFET switching network configuration in accordance with an aspect of the present invention. The multiple battery system 100 includes a first switching cell 108 having a first p-type MOSFET Q15 coupled to a second p-type MOSFET Q16. The first switching cell 108 couples and isolates a first battery 112 from a power bus 138. The drains of the first p-type MOSFET Q15 and the second p-type MOSFET Q16 are coupled to one another, such that the back-gate diodes or parasitic diodes of the first p-type MOSFET Q15 and the second p-type MOSFET Q16 have conduction paths in opposite directions. The body diodes formed between the substrate and source (not shown) have opposite conduction paths of the first p-type MOSFET Q15 and the second p-type MOSFET Q16 since the body diodes are in series with the back-gate diode and have a conduction direction opposite to the back-gate diode. The first switching cell 108 is turned on and off by a single control line /SBAT1. A second switching cell 110 includes a third p-type MOSFET Q17 coupled to a fourth p-type MOSFET Q18 to isolate a second battery 114 from the power bus 138. The second switching cell 110 is configured the same as the first switching cell 108 in a back-to-back configuration. The second switching cell 110 is turned on and off by a single control line /SBAT2.

A single p-type MOSFET device Q19 isolates the battery bus 138 from a load 104. A charger 106 is also coupled to the battery bus 138. The charger 106 includes an enable control that disables and enables the charger 106. A single battery load control line ( /BATLD) has a first state that enables the charger 106 and opens the load switch Q19, and a second state that disables the charger 106 and closes the load switch Q19. A DC supply 102 is coupled to the load 104 through a diode D3. The DC supply 102 is also coupled to the charger 106 to provide power to the charger 106. When power from the DC supply 102 is available, the DC supply 102 powers the load 104 and the charger 106. The battery load control line ( /BATLD) is set to a state that enables the charger 106 and opens the load switch Q19. The charger 106 can provide charge to the first battery 112 by selecting the first switching cell 108 using the control line /SBAT1, or the second battery 114 by selecting the second switching cell 110 using the control line /SBAT2. When power from the DC supply 102 is not available, the first battery 112 can provide power to the load 104 by selecting the first switching cell 108 and setting the battery load control line ( /BATLD) to a state that disables the charger 106 and closes the load switch Q19. The second battery 114 can provide power to the load 104 by selecting the second switching cell 110, and setting the battery load control line ( /BATLD) to a state that disables the charger 106 and closes the load switch Q19. TABLE 1 illustrates a truth table for the logic of the switching network illustrated in FIG. 4.

TABLE I

| DC | /BATLD | /SBAT1 | /SBAT2 | STATE |
|---|---|---|---|---|
| ON | HI | LO | HI | DC SUPPLY TO LOAD, CHARGER ON, BATT1 CHARGING |
| ON | HI | HI | LO | DC SUPPLY TO LOAD, CHARGER ON, BATT2 CHARGING |
| OFF | LO | HI | LO | BATT2 TO LOAD, BATT1 OPEN, CHARGER OFF |
| OFF | LO | LO | HI | BATT1 TO LOAD, BATT2 OPEN, CHARGER OFF |

In the implementation of FIG. 4, the internal logic enables the battery power bus connection to load only when the DC supply voltage is below the battery power bus voltage. This is required to prevent battery over-charging, as the diode topology of FIG. 4 does not effectively isolate the DC supply from the load in all states. Therefore, an additional controllable switch can be provided between the DC supply and the load to isolate the DC supply from the load and selected battery by turning the controllable switch off. It is to be appreciated that although the MOSFETS Q15–Q19 are illustrated as p-type devices, any combination of p-type and n-type devices can be employed in accordance with the present invention. Additionally, any combination of active levels for control logic can be employed.

Figure 5:
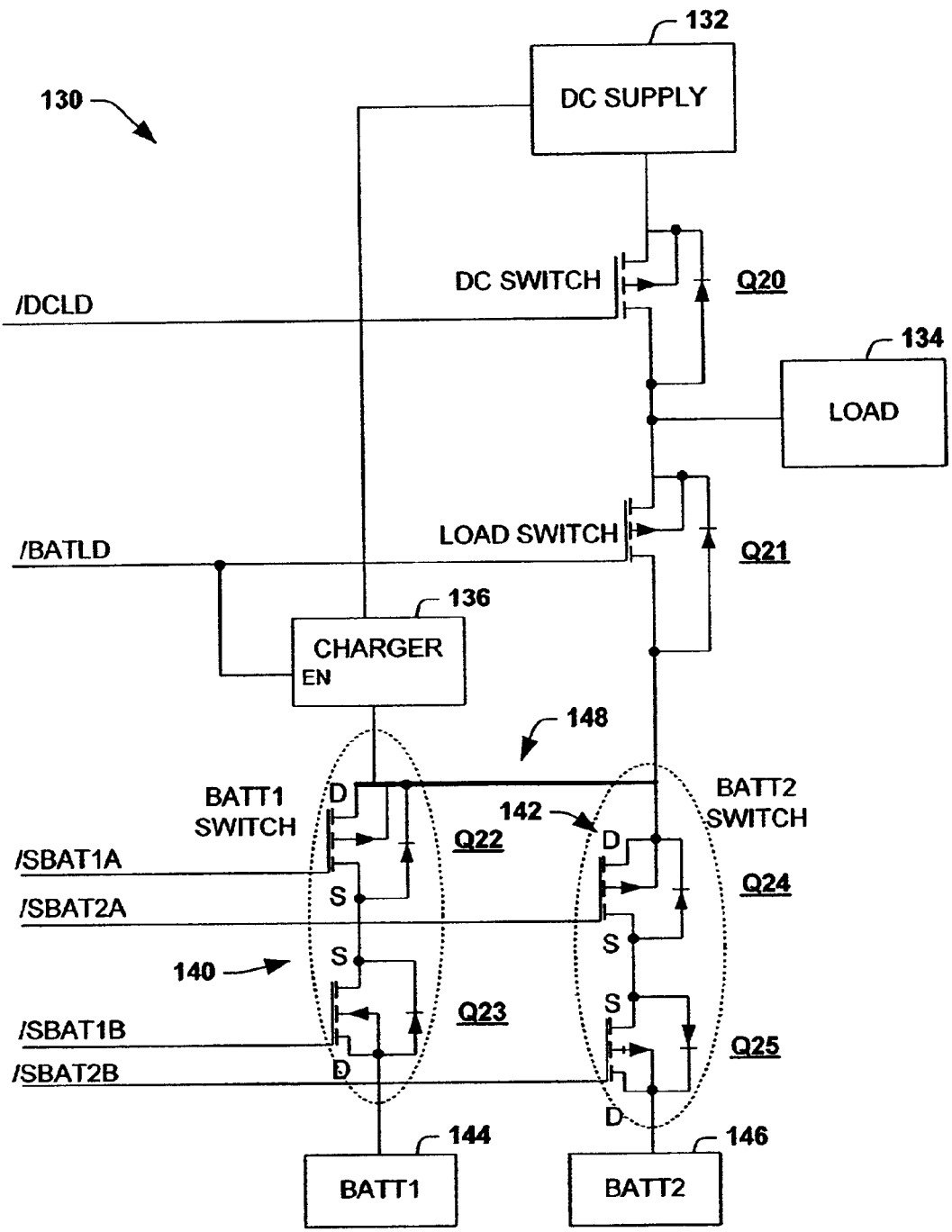
FIG. 5 illustrates a multiple battery system switching network with dedicated control lines in accordance with an aspect of the present invention.

FIG. 5 illustrates a multiple battery system 130 with individual control lines for MOSFET devices in a switching network in accordance with an aspect of the present invention. The multiple battery system 130 includes a first switching cell 140 having a first p-type MOSFET Q22 coupled to a second p-type MOSFET Q23. The first switching cell 140 couples and isolates a first battery 144 from a power bus 148.

The drains of the first p-type MOSFET Q22 and the second p-type MOSFET Q23 are coupled to one another similar to the switching cells illustrated in FIG. 4. The first p-type MOSFET Q22 is turned on and off by a dedicated control line /SBAT1A, and the second p-type MOSFET Q23 is turned on and off by a dedicated control line /SBAT1B. A second switching cell 142 includes a third p-type MOSFET Q24 coupled to a fourth p-type MOSFET Q25 to isolate a second battery 146 from the power bus 148. The second switching cell 142 is configured the same as the first switching cell 140 in a back-to back configuration. The third p-type MOSFET Q24 is turned on and off by a dedicated control line /SBAT2A, and the fourth p-type MOSFET Q25 is turned on and off by a dedicated control line /SBAT2B.

An p-type MOSFET device Q21 (load switch) isolates the battery bus 148 from a load 134. A charger 136 is also coupled to the battery bus 148. The charger 136 includes an enable control that disables and enables the charger 136. A single control line (/BATLD) has a first state that enables the charger 136 and opens the load switch Q21, and a second state that disables the charger 136 and closes the load switch Q21 coupling the load 134 to the battery bus 148. It is to be appreciated that separate control lines can be provided for controlling the load switch Q21 and the charger enable. A DC supply 132 is coupleable to the load 134 through a n-type MOSFET device Q20 (DC switch). The DC switch Q20 replaces the diode D3 illustrated in FIG. 4, so that providing power to the load 134 from the DC supply 132 is controllable. The DC switch Q20 is controlled by a control line (/DCLD).

When power from the DC supply 132 is available, the DC switch Q20 couples the DC supply 132 to the load 134 to provide power to the load 134. Power is also provided to the charger 136 from the DC power supply 132. The battery load control line (/BATLD) is set to a state that enables the charger 136 and opens the load switch Q21. The charger 136 can provide charge to the first battery 144 by selecting the first switching cell 140 using control line /SBAT1A and /SBAT1B, or the second battery 146 by selecting the second switching cell 142 using the control line /SBAT2A and /SBAT2B. When power from the DC supply 132 is not available, the first battery 144 can provide power to the load 134 by selecting the first switching cell 140 via control lines /SBAT1A and /SBAT1B, and setting the battery load control line (/BATLD) to a state that disables the charger 136 and closes the load switch Q21. The second battery 146 can provide power to the load 134 by selecting the second switching cell 142 via control lines /SBAT2A and /SBAT2B, and setting the battery load control line (/BATLD) to a state that disables the charger 136 and closes the load switch Q21. TABLE 2 illustrates a truth table for the logic of the switching network illustrated in FIG. 5.

TABLE 2

| /DCLD | /BATLD | /SBAT1A /SBAT1B | /SBAT2A /SBAT2B | STATE |
|---|---|---|---|---|
| LO | HI | LO | HI | DC SUPPLY TO LOAD, CHARGER ON, BATT1 CHARGING |
| LO | HI | HI | LO | DC SUPPLY TO LOAD, CHARGER ON, BATT2 CHARGING |
| HI | LO | HI | LO | BATT2 TO LOAD, BATT1 OPEN, CHARGER OFF |
| HI | LO | LO | HI | BATT1 TO LOAD, BATT2 OPEN, CHARGER OFF |

TABLE 2-continued

| /DCLD | /BATLD | /SBAT1A /SBAT1B | /SBAT2A /SBAT2B | STATE |
|---|---|---|---|---|
|  |  |  |  | BATT2 OPEN, CHARGER OFF |

The examples illustrated in FIGS. 4–5 employ p-type MOSFETs selected to minimize the battery to load path on resistance and simplify control logic design. However, distinct embodiments of this switching network can be implemented with n-type only devices or another placement for n-type/p-type devices in a mixed n-type/p-type MOSFET configuration, as long as the back-gate diodes used in the battery switches are in a back-to-back configuration with a high impedance in off mode and the back-gate diodes for the DC and load switch have the same polarity as illustrated in FIGS. 4–5.

Figure 6:
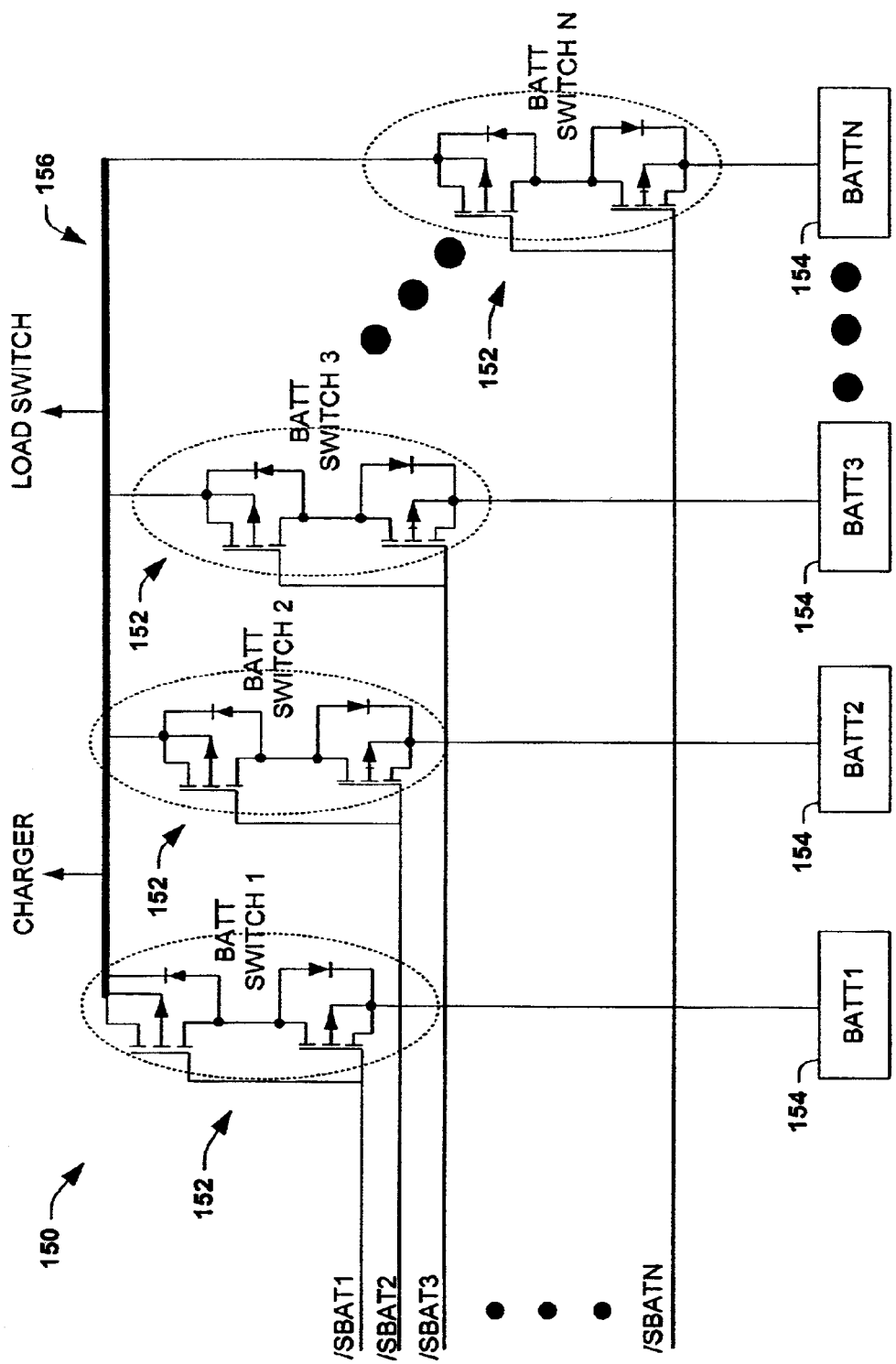
FIG. 6 illustrates a portion of a multiple battery system having a plurality of batteries and back-to-back MOSFET devices in accordance with an aspect of the present invention.

Additional batteries can be added to this network, requiring only two additional MOSFET devices (one additional switching cell) and one additional control signal per battery added, with the new battery/switching cell configuration being added in parallel to the existing battery/battery switches. FIG. 6 illustrates a portion of a multiple battery system 150 having a plurality of batteries and a plurality of back-to-back MOSFET devices in accordance with the present invention. The multiple battery system 150 includes a plurality of batteries 154 from BATT1 to BATTN that can be coupled and decoupled from a battery power bus 156 using a plurality of back-to-back MOSFET battery switches 152 from BATT SWITCH 1 to BATT SWITCH N. A single back-to-back MOSFET battery switch and a single control line are provided for each additional battery added to the multiple battery system 150. Each of the back-to-back MOSFET battery switches 152 are coupled to the battery power bus 156 and its respective battery, such that all of the switches 152 are coupled in parallel. The battery power bus 156 is also connected to a charger and a load switch as illustrated in FIGS. 3–5.

Figure 7:
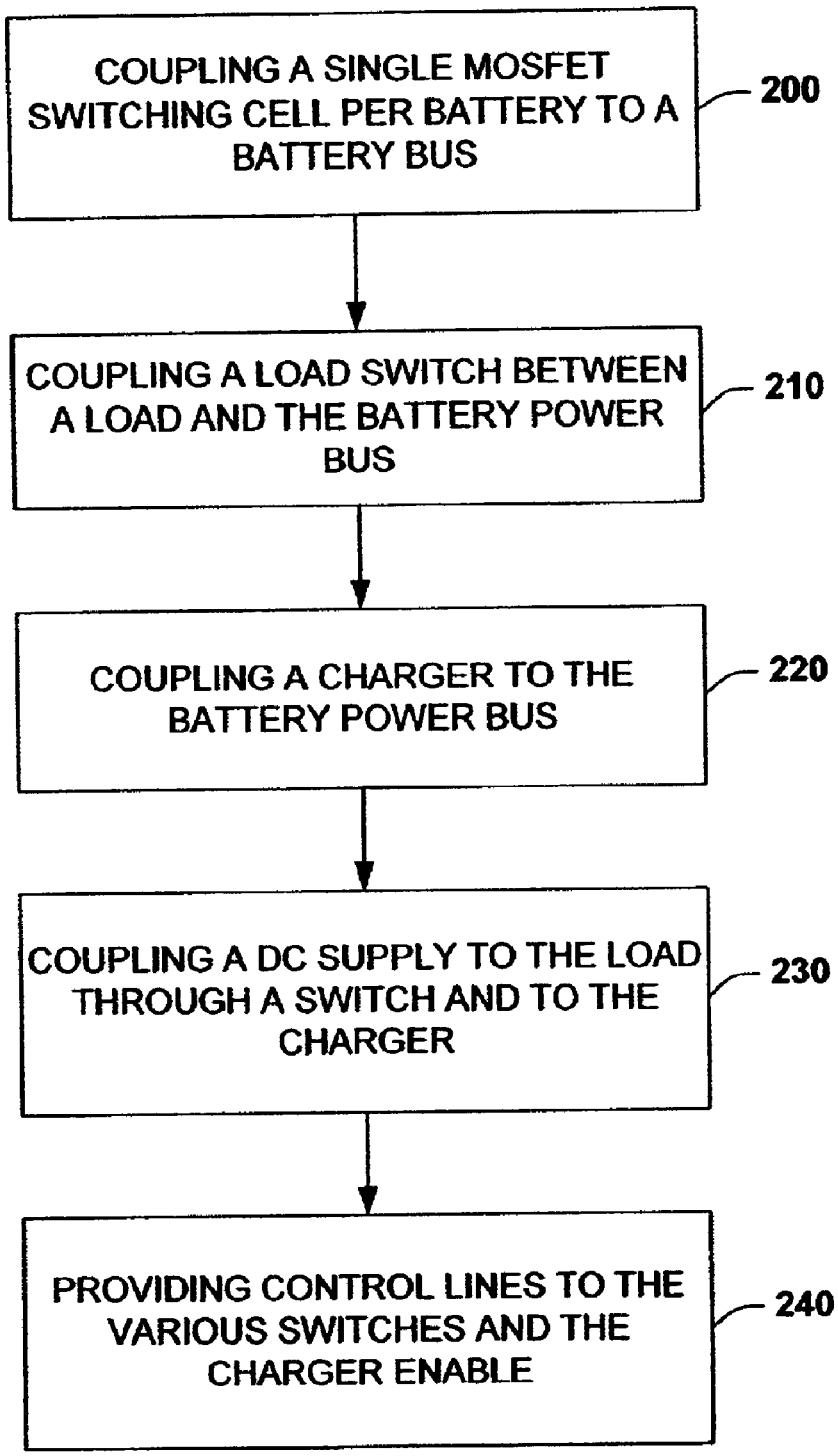
FIG. 7 illustrates block diagram of a methodology for providing a multiple battery system in accordance with an aspect of the present invention.
Figure 8:
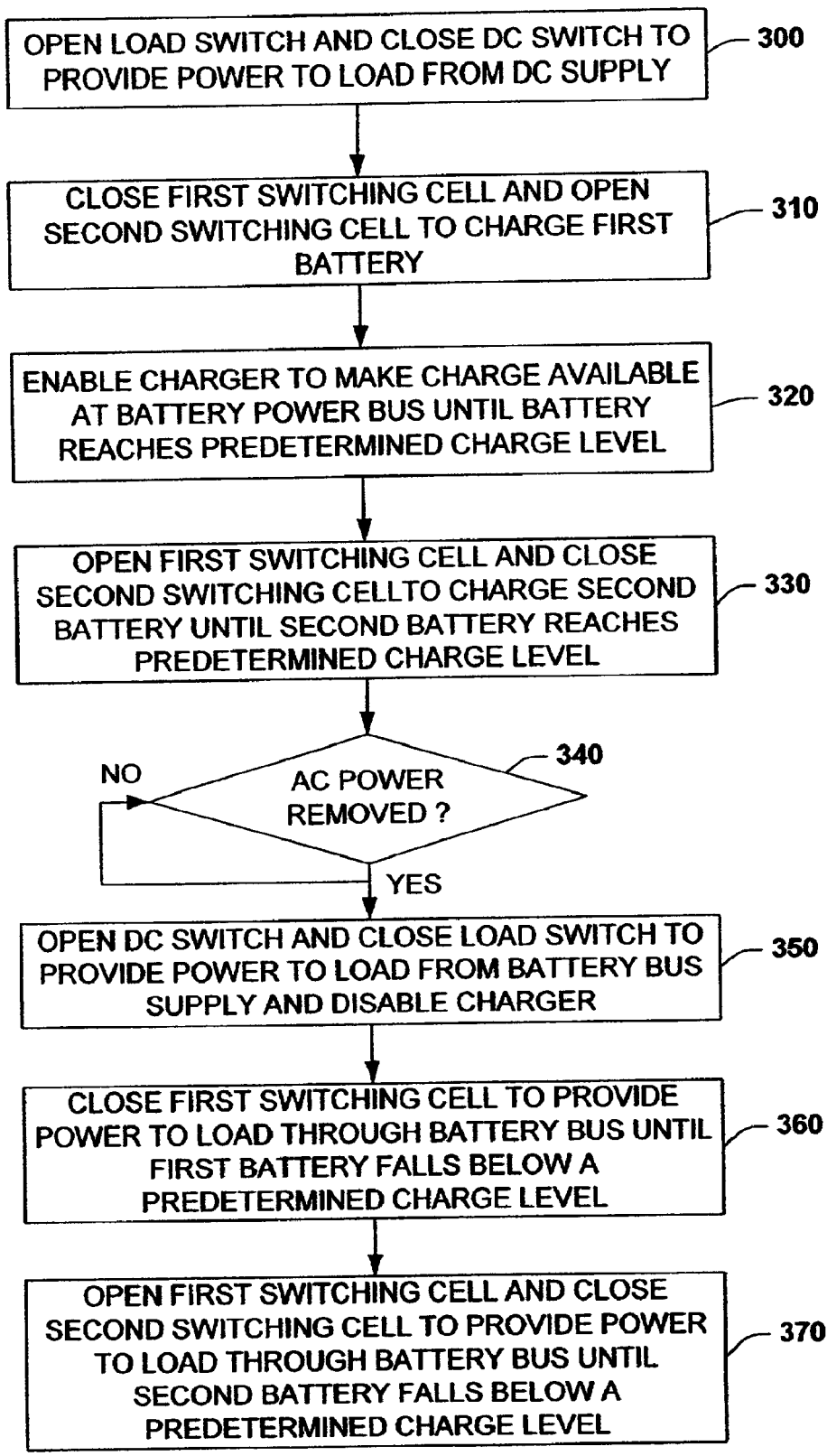
FIG. 8 illustrates block diagram of a methodology for operating a multiple battery system and switching network in accordance with an aspect of the present invention.

In view of the foregoing structural and functional features described above, methodologies in accordance with various aspects of the present invention will be better appreciated with reference to FIGS. 7–8. While, for purposes of simplicity of explanation, the methodologies of FIGS. 7–8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates one particular methodology for providing a multiple battery system and switching network in accordance with an aspect of the present invention. At 200, a single MOSFET switching cell is provided for each battery in the multiple battery system and coupled to the respective battery on one end and a battery bus on the other end, such that the switching cells are coupled in parallel. The single MOSFET switching cell can be comprised of two n-type MOSFET devices coupled in a back-to-back configuration or two p-type MOSFET devices coupled in a back-to-back configuration. The methodology then proceeds to 210. At 210 a load switch is coupled between a load and the battery bus. The load switch can be a p-type or n-type MOSFET. At 220, a charger that includes an enable control line is coupled to the battery bus. A DC supply is then coupled to the load through a DC supply switch at 230. The DC supply is also coupled to the charger to provide the charger with power. The DC supply switch can be a diode or a controllable n-type or p-type MOSFET switch. The methodology then proceeds to 240. At 240, various control lines are provided to the various switches and the charger enable.

FIG. 8 illustrates one particular methodology for operating a multiple battery system and switching network such as those described in FIGS. 3–6 in accordance with an aspect of the present invention. At 300, the load switch is opened and the DC supply switch is closed providing power to the load from the DC supply. At 310, the first switching cell is closed and the second switching cell is opened, so that the first battery can be charged. At 320, the charger is enabled so that charge is available at the battery power bus so that the first battery connected to the battery power bus will be charged. The first battery is charged until the first battery reaches a predetermined charge level. Various methodologies can be employed to determine when the first battery reaches the predetermined charge level. At 330, the first switching cell is opened and the second switching cell is closed, so that the second battery can be charged. The second battery is charged until the second battery reaches a predetermined charge level. The second switching cell is then opened so that charging of the first and second battery terminate. Various methodologies can be employed to determine when the second battery reaches the predetermined charge level. Additionally, various methodologies can be employed to determine when and in what order to charge the first and second batteries and any other number of batteries forming part of the multiple battery system.

The methodology advances to 340 to determine if AC power is removed resulting in the removal of DC power. If AC power is not removed (NO), the methodology repeats 340. If AC power is removed (YES), the methodology proceeds to 350. At 350, the DC supply switch is opened and the load switch is closed to provide power to the load from the battery bus and to disable the charger. At 360, the first switching cell is closed to provide power to the load through the battery bus by the first battery, until the first battery fall below a predetermined charge level. Various methodologies can be employed to determine if the first battery falls below a predetermined charge level. At 370, the first switching cell is opened and the second switching cell is closed to provide power to the load through the battery bus by the second battery, until the second battery fall below a predetermined charge level.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A portable electronic device comprising:
    a first switching cell coupled to a first battery on a first end and a battery power bus on a second end, the first switching cell being comprised of two back-to-back MOSFET devices;
    a second switching cell coupled to a second battery on a first end and the battery power bus on a second end, the second switching cell being comprised of two back-to-back MOSFET devices;
    a load switch coupled to the battery bus on a first end and a load on a second end;
    a charger coupled to the battery bus; and
    a DC supply connected to the load through a DC switch.

2. The portable electronic device of claim 1, the DC switch being one of a p-type MOSFET device and a n-type MOSFET device.

3. The portable electronic device of claim 1, the load switch being one of a p-type MOSFET device and a n-type MOSFET device.

4. The portable electronic device of claim 1, the two back-to-back MOSFET devices of the first switching cell and the second switching cell being n-type MOSFET devices.

5. The portable electronic device of claim 1, the two back-to-back MOSFET devices of the first switching cell and the second switching cell being p-type MOSFET devices.

6. The portable electronic device of claim 1, further comprising a control system that controls the switching of the first switching cell through a first control line, the second switching cell through a second control line and the load switch through a load control line.

7. The portable electronic device of claim 6, the control system controls the switching of the DC switch through a DC switch control line.

8. The portable electronic device of claim 6, the load control line also enables and disables the charger.

9. The portable electronic device of claim 1, the DC supply coupled to an AC/DC adapter that receives AC voltage and provides unregulated DC voltage to the DC supply, the DC supply provides regulated DC voltage to the load and the charger upon detection of AC power.

10. The portable electronic device of claim 1, further comprising N number of batteries and M number of switching cells comprised of two back-to-back MOSFET devices, the switching cells coupled to a respective battery on a first end and the battery power bus on a second end, N and M being integers greater than 2 having equal values, such that a single switching cell corresponds to a single battery.

11. A switching network for a multiple battery system comprising:
    a first back-to-back MOSFET device connectable to a first rechargeable power source on a first end and a power bus on a second end;
    a second back-to-back MOSFET device connectable to a second rechargeable power source on a first end and the power bus on a second end;
    a load switch coupled to the power bus on a first end and a load on a second end;
    a charger coupled to the power bus; and
    a DC supply connected to the load through a DC switch.

12. The switching network of claim 11, the DC switch being one of a diode, a p-type MOSFET device and a N-type MOSFET device.

13. The switching network of claim 11, the load switch being one of a p-type MOSFET device and a N-type MOSFET device.

14. The switching network of claim 11, the first and the second back-to-back MOSFET devices being one of n-type MOSFET devices and p-type devices.

15. The switching network of claim 11, further comprising a first control line that controls the switching of the first back-to-back MOSFET device, a second control line that controls the switching of the second back-to-back MOSFET device and a third control line that controls the switching of the load switch.

16. The switching network of claim 11, further comprising a first control line that controls the switching of a first MOSFET device and a second control line that controls the switching of a second MOSFET device of the first back-to-back MOSFET device, a third control line that controls the switching of a third MOSFET device and a fourth control line that controls the switching of a fourth MOSFET device of the second back-to-back MOSFET device, and a fifth control line that controls the switching of the load switch.

17. The switching network of claim 16, further comprising a sixth control line that controls the switching of the DC switch.

18. The switching network of claim 11, further comprising M number of back-to-back MOSFET devices connectable to N number of respective rechargeable power sources on a first end and the battery power bus on a second end, N and M being integers greater than 2 having equal values, such that a single back-to-back MOSFET device corresponds to a single rechargeable power source.

19. A method for providing a multiple battery system, the method comprising:

coupling a first back-to-back MOSFET device to a first battery on a first end and a battery bus on a second end;

coupling a second back-to-back MOSFET device to a second battery on a first end and the battery bus on a second end;

coupling a load switch to the battery power bus on a first end and a load on a second end;

coupling a charger to the battery power bus; and connecting a DC supply to the load through a DC switch and to the charger.

20. The method of claim 19, further comprising providing at least one control signal for each of the first back-to-back MOSFET device, the second back-to-back MOSFET device and the load switch.

21. The method of claim 20, the control signal that controls the load switch also enables and disables the charger.

22. The method of claim 20, further comprising a separate control signal that enables and disables the charger.

23. The method of claim 19, further comprising providing additional back-to-back MOSFET devices for each additional battery, each additional back-to-back MOSFET device coupled to the battery power bus on a first end and an additional battery on a second end.

* * * * *